Aug. 26, 1969     P. T. GATES, JR     3,463,575

LIGHT BEAM SAMPLING APPARATUS

Filed Dec. 9, 1966

PERCIVAL T. GATES, JR.
INVENTOR.

BY *[signature]*

ATTORNEYS

Patented Aug. 26, 1969

3,463,575
LIGHT BEAM SAMPLING APPARATUS
Percival T. Gates, Jr., Weston, Mass., assignor to EG & G, Inc., Bedford, Mass., a corporation of Massachusetts
Filed Dec. 9, 1966, Ser. No. 600,518
Int. Cl. G02b 27/14
U.S. Cl. 350—172                                     1 Claim

ABSTRACT OF THE DISCLOSURE

Three beam splitters are so arranged that incoming light polarized in the plane of incidence of the first beam splitter will be reflected therefrom as light polarized perpendicular to the plane of incidence of the second beam splitter; and the incoming light will be transmitted through the first beam splitter as light polarized perpendicular to the plane of incidence of the third beam splitter. The light reflected from the second beam splitter is the sample beam and will have vertically and horizontally polarized components of the same relative intensities as the light transmitted through the third beam splitter and as the incoming light.

INTRODUCTION

The present invention relates to light measurement and, in particular, to apparatus adapted to extract a sample light beam for measurement purposes from a light beam that is to be utilized for other purposes.

There are a number of situations involving the use of light beams where it is desirable that one be able to measure certain characteristics of the light beam that is being utilized without changing the relative intensity characteristics of the various components of light contained in the beam. This is particularly so in applications involving laser light beams of the type produced, for example, when a ruby rod is pumped with light energy from an electric flash tube. It has been found that the intensity characteristics of such laser light beams vary considerably no matter how much care is exercised to use the same pumping energy. Thus, one cannot measure the intensity characteristics of a first laser beam and then use subsequent laser beams produced under the same conditions and expect that the subsequent beams will have the same intensity characteristics. This problem is particularly undesirable in many scientific investigations involving the use of laser beams.

SUMMARY OF THE INVENTION

The present invention provides a solution to this problem by sampling the light beam being used. The intensity characteristics of the incoming beam, the sample beam and the through beam all have the same relative proportions. The incoming light beam is directed toward a first beam splitter at an angle of incidence of 45°. The light beam reflected therefrom is directed toward a second beam splitter at an angle of incidence of 45° thereupon. However, the second beam splitter is so rotated that light polarized in the plane of incidence of the first beam splitter is reflected therefrom and incident on the second beam splitter as light polarized perpendicular to the plane of incidence of the second beam splitter. Likewise, light polarized perpendicular to the plane of incidence of the first beam splitter is reflected therefrom and incident on the second beam splitter as light polarized in the plane of incidence of the second beam splitter. The reflected light beam from the second beam splitter is utilized as the sample beam. The transmitted light beam is directed toward a third beam splitter at an angle of incidence thereupon of 45°. However, the third beam splitter is so rotated that light polarized in the plane of incidence of the first beam splitter is transmitted therethrough and incident on the third beam splitter as light polarized perpendicular to the plane of incidence of the third beam splitter. Likewise, light polarized perpendicular to the plane of incidence of the first beam splitter is transmitted therethrough and incident on the third beam splitter as light polarized in the plane of incidence of the third beam splitter. The light transmitted by the third beam splitter is the through beam directed toward the target.

OBJECTS

An object of the present invention is to provide apparatus for sampling a light beam without changing the relative intensity characteristics of the sample and through beams.

A further object is to provide apparatus that will permit measurement of characteristics of a light beam that is to be utilized for another purpose without changing the relative characteristics thereof.

Still a further object is to provide apparatus for sampling a laser light beam without changing the relative intensity characteristics thereof.

Other objects and features of the invention will become apparent upon perusal of the following more detailed description and appended claims.

THEORY

Figure 3:
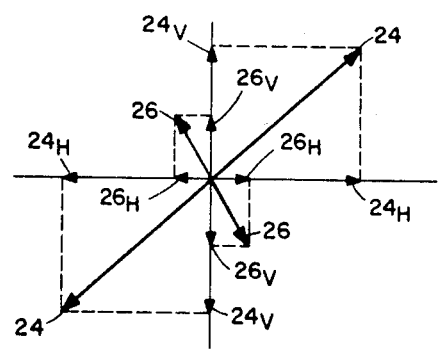
FIG. 3 is a graph illustrating the vertical and horizontal components of two polarized light rays.
Figure 1:
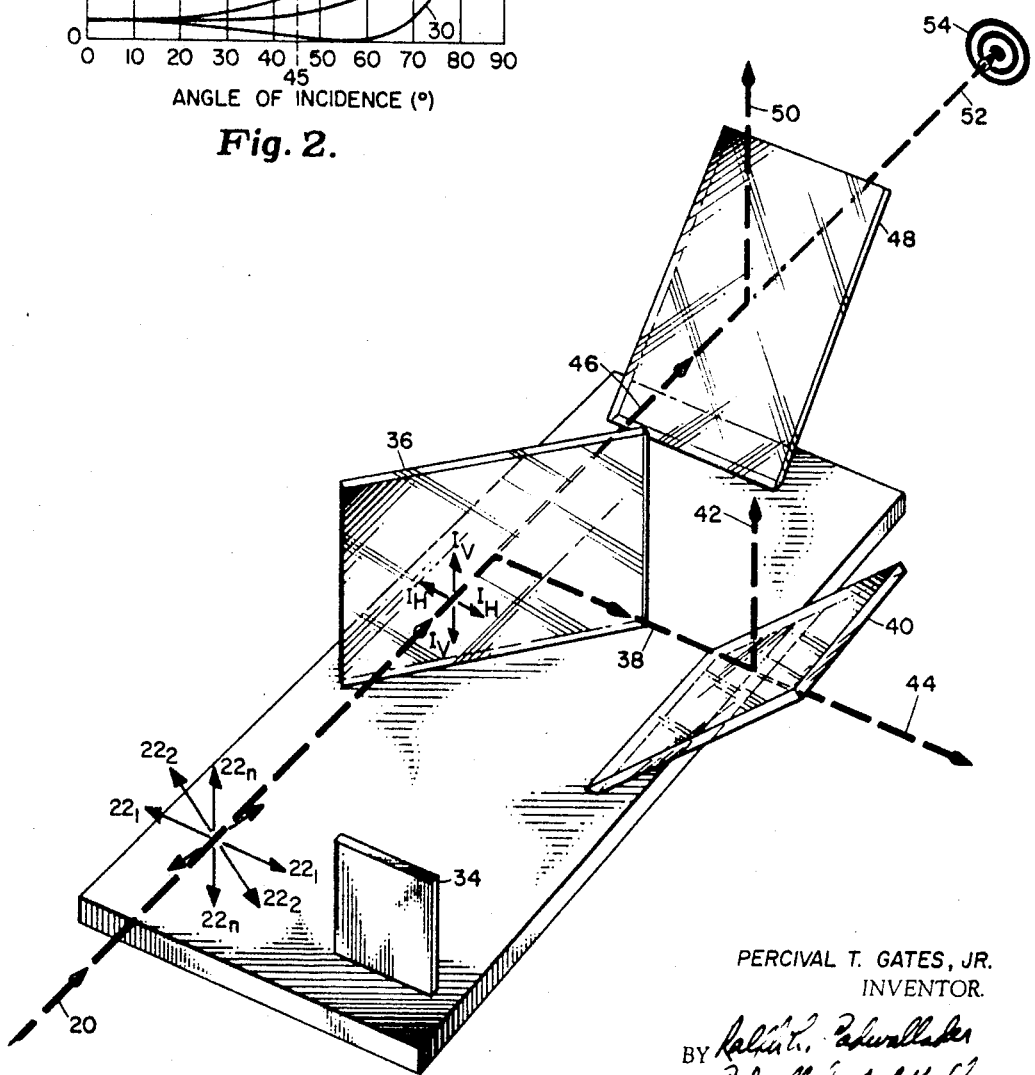
FIG. 1 is a schematic illustration of the embodiment of the present invention.

In the electromagnetic theory of light, the electric and magnetic vectors lie in mutually perpendicular planes, and the plane of polarization is understood to be the plane containing the magnetic vector. Ordinary or natural light is assumed to be composed of beams of plane-polarized light representing all possible azimuths. Referring to FIGURE 1, input light beam 20 is assumed to consist of an unknown number of pencils of light plane-polarized in the planes containing magnetic vectors $22_1, 22_2, \ldots 22_n$. Regardless of the azimuth of the plane of polarization of a pencil of light, it acts in the physical world as if it is composed of two components that are plane polarized in mutually perpendicular azimuths, as illustrated in FIGURE 3. Here magnetic vectors 24 and 26 represent pencils of light polarized in planes perpendicular to the plane of the figure. It is assumed that each consists of two components that are plane polarized in mutually perpendicular azimuths. The components are $24_V$, $24_H$, $26_V$ and $26_H$ where the subscripts V and H indicate, for convenience of explanation, vertical and horizontal polarization respectively. Also, for convenience, the vertical and horizontal components of the unknown number of pencils of light in beam 20 are grouped together and denoted $I_V$ and $I_H$ respectively with I referring to the intensities of the components. I does not means that the intensities have been summed in any manner. $I_V$ and $I_H$ are illustrated in FIGURE 1.

A quantitative expression for the amount of light reflected at the boundary surface between two transparent media was first derived by Fresnel. Where $I_H$ represents the intensities of pencils of light plane polarized in the plane of incidence, the intensities $I_{RH}$ of the reflected pencils of light are given by $$\frac{I_{RH}}{I_H} = \frac{\sin^2(i-r)}{\sin^2(i+r)} = r_h$$

where $i$ and $r$ are the angles of incidence and refraction and $r_h$ is the value of the ratio. Where $I_V$ represents the intensities of pencils of light polarized perpendicular to the plane of incidence, the intensities $I_{RV}$ of the reflected pencils of light are given by $$\frac{I_{RV}}{I_V} = \frac{\tan^2(i-r)}{\tan^2(i+r)} = r_v$$

Figure 2:
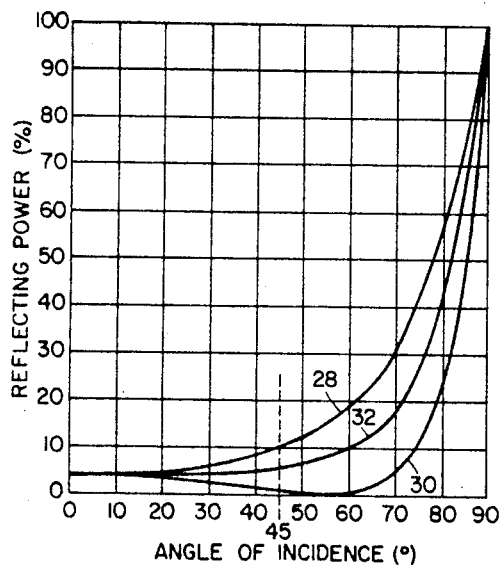
FIG. 2 is a graph illustrating the reflecting powers of a surface.

The ratios $I_{RH}/I_H$ and $I_{RV}/I_V$ are known as the reflecting powers of the particular reflecting surface. The reflecting powers of spectacle crown glass for various angles of incidence are illustrated in FIGURE 2 where curve 28 represents the reflecting power for light polarized in the plane of incidence and curve 30 represents the reflecting power for light polarized perpendicular to the plane of incidence. Curve 32 represents the reflecting power of natural or unpolarized light. Note that for an angle of incidence of 45° the approximate reflecting powers are: $r_h=0.1$ and $r_v=0.02$.

For a single air-glass boundary the transmitting powers in the above example are:

$$\frac{I_{TH}}{I_H} = (1-r_h) = t_h = (1-0.1) = 0.9$$

and $$\frac{I_{TV}}{I_V} = (1-r_v) = t_v = (1-0.02) = 0.98$$

A sheet of glass, and thus a beam splitter, has two air-glass boundaries. Hence, the transmitting powers, not considering minimal losses caused by absorption and multiple reflections within the glass, are:

$$T_h = (t_h)^2 = (0.9)^2 = 0.81$$

and $$T_v = (t_v)^2 = (0.98)^2 = 0.96$$

The foregoing values of reflecting and transmitting powers are obviously first order values and do not account for multiple reflections and refractions within a glass plate. However it should be apparent intuitively and may be shown mathematically that the vertical and horizontal components of the sample and through beams have intensities of the same relative proportions as in the input beam. Thus, the first order values are suitable for practical applications.

DETAILED DESCRIPTION

Referring to FIGURE 1, the embodiment of the present invention utilizes mirror 34 together with collimating apparatus (not shown) to assure that input beam 20 is incident on beam splitter 36 at an angle of incidence of 45°, as illustrated. Beam splitter 36 may be a glass plate or pellicle. Reflected beam 38 thus will be perpendicular to beam 20. Beam splitter 40, which is made of the same material as beam splitter 36, is so located that beam 38 is incident thereon at an angle of incidence of 45°. Reflected beam 42 thus is perpendicular to beam 38. Note that beam splitter 40 could be rotated 90° toward beam splitter 36 to produce the same result, but with reflected beam 42 directed downward.

Note that the horizontal polarized components $I_H$ incident on beam splitter 36 in the plane of incidence are reflected therefrom as horizontally polarized components still in the same plane of incidence. However, the plane of incidence of beam splitter 36 is perpendicular to the plane of incidence of beam splitter 40. Hence, these horizontal components become vertical components with respect to beam splitter 40. Likewise, vertical components with respect to beam splitter 36 become horizontal components in the plane of incidence of beam splitter 40. Using the derived terms and the foregoing values for spectacle crown glass one obtains for beam 38:

$$I_{RH} = r_h \cdot I_H = 0.1 I_H$$

and $I_{RV} = r_v I_V = 0.02 I_V$.

Then, using the same reflecting powers, one obtains for beam 42: $I_{RH} = r_h r_v I_V = 0.1(0.02 I_V)$ and $$I_{RV} = r_v r_h I_H = 0.02(0.1 I_H)$$

or $I_{RH} = 0.002 I_V$ and $I_{RV} = 0.002 I_H$. Thus it is seen that the relative intensities of the vertical and horizontal components in beam 42 are unchanged. Beam 42 is the sample beam. Transmitted beam 44 is not used.

Transmitted beam 46 has the same direction and is parallel, in extension, to input beam 20. Beam splitter 48, which is made of the same material as beam splitter 36, is so located that beam 46 is incident thereon at an angle of incidence of 45°. Reflected beam 50, which is not used, thus is perpendicular to beam 46. Note that beam splitter 48 could be rotated 90° toward beam splitter 36 to produce the same result, but with reflected beam 50 directed downward.

Note that the horizontally polarized components $I_H$ incident on beam splitter 36 in the plane of incidence are transmitted through beam splitter 36 still in the same plane. However, the plane of incidence of beam splitter 36 is perpendicular to the plane of incidence of beam splitter 48. Hence, these horizontal components become vertical components with respect to beam splitter 48 and are transmitted therethrough as such. Likewise, vertical components with respect to beam splitter 36 become horizontal components in the plane of incidence of beam splitter 48. Using the derived terms and the foregoing values for spectacle crown glass one obtains for beam 46: $I_{TH} = T_h I_H = 0.81 I_H$ and $I_{TV} = T_v I_V = 0.96 I_V$. Then, using the same transmitting powers, one obtains for beam 52: $I_{TH} = T_h T_v I_V = 0.81(0.96) I_V$ and $$I_{TV} = T_v T_H I_H = 0.96(0.81 I_H)$$

or $I_{TH} = 0.777 I_V$ and $I_{TV} = 0.777 I_H$. Thus, it is seen that the relative intensities of the vertical and horizontal components in beam 52 are unchanged. Beam 52 is the through beam and may be directed on a target 54 or be used for some other purpose.

The above-described embodiment has been used in many applications with various kinds of light beams, working equally well with light beams produced by incandescent lamps and high power light beams containing megajoules of instantaneous power produced by high power lasers of the ruby-rod type.

What is claimed is:
1. Apparatus for sampling a high power light beam and for maintaining unchanged the relative intensities of the horizontal and vertical components of the plane-polarized light beams in the input light beam, the sample light beam and the through light beam, comprising:
  a first beam splitter so located in air that the angle of incidence of the input light beam thereupon may be fixed at 45° producing therefrom a reflected beam and a transmitted beam;
  a second beam splitter so located in air that the beam reflected from the first beam splitter is directly incident thereupon at an angle of incidence of 45°, the plane of incidence of the second beam splitter being perpendicular to the plane of incidence of the first beam splitter, the reflected beam from the second beam splitter constituting the sample light beam; and
  a third beam splitter so located in air that the beam transmitted through the first beam splitter is direct- ly incident thereupon at an angle of incidence of 45°, the plane of incidence of the third beam splitter being perpendicular to the planes of incidence of the first and second beam splitters, the beam transmitted through the third beam splitter constituting the through light beam, the three beam splitters being made of the same material and having reflecting powers at their air boundaries at angles of incidence of 45° which are small fractions of their corresponding transmitting powers.

References Cited

UNITED STATES PATENTS

| | | | |
|---|---|---|---|
| 1,371,970 | 3/1921 | Furman | 350—173 |
| 2,161,126 | 6/1939 | Bigley | 350—173 X |
| 2,896,499 | 7/1959 | Lang. | |

DAVID SCHONBERG, Primary Examiner

J. W. LEONARD, Assistant Examiner

U.S. Cl. X.R.

350—152; 356—213